July 31, 1928.  1,679,088
A. T. KOEHLER
ELECTRIC BRAZING MACHINE
Filed June 10, 1927
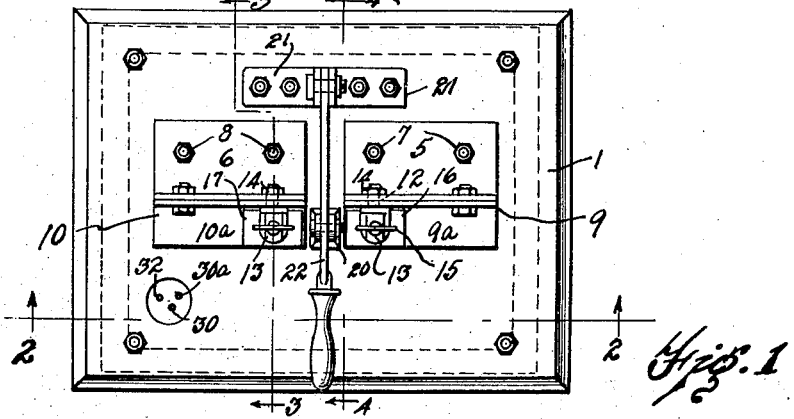
INVENTOR.
Albert T. Koehler
BY
ATTORNEY.

Patented July 31, 1928.

1,679,088

UNITED STATES PATENT OFFICE.

ALBERT T. KOEHLER, OF PONTIAC, MICHIGAN.

ELECTRIC BRAZING MACHINE.

Application filed June 10, 1927. Serial No. 197,801.

This invention relates to improvements in electric brazing machines, and refers more particularly to brazing machines intended for such purposes as brazing the ends of band saw blades.

The invention aims to provide, among other things, an electric brazing machine wherein a band saw blade, or other article, may be held firmly adjacent to its ends with the latter overlapping so that they lie exactly over one another; wherein electric connections are attached to the supporting members so that a circuit is completed through the ends to be brazed; wherein means are provided for pressing the ends together after the solder between them has been fused so that as it hardens a flat, firm joint is made; and wherein a joint may be very quickly and easily made.

With these and other objects in view which will become apparent as the specification proceeds, the invention is hereinafter more fully described with the aid of the accompanying drawings in which:

Figure 1 is a plan view of the invention.

Figures 2, 3 and 4 are sections on the lines 2—2, 3—3 and 4—4 respectively of Figure 1.

Figure 5 is a detail on an enlarged scale.

Referring to the drawings, 1 designates a table mounted on uprights 2 over a base 3. It will be noted that ventilating openings 4 are provided through the uprights.

On the table are two angle members 5 and 6 held in position as by bolts 7 and 8. These angle members are substantially in line with one another and have their adjacent ends spaced apart. On one side of these angle members angle brackets 9 and 10 are so secured that they also are substantially in line with one another and have their adjacent ends substantially the same distance from one another as the adjacent ends of the angle members. The supporting flanges 9ª and 10ª of the angle brackets are adapted to support the band saw blade portions 11 and 11ª adjacent to the joint 11ᵇ as shown in Figure 5.

Through each angle member and its bracket threaded projections 12 extends so that the threaded eyes 13 integral with these projections extend over the supporting flanges 9ª and 10ª. Nuts 14 are in threaded engagement with the projections 12 thereby holding the angle members and their brackets together. Screws 15 are in threaded engagement with the eyes 13. Clamping plates 16 and 17 are placed over the supporting flanges 9ª and 10ª respectively; each plate is mounted on the lower end of one of the screws 15 so that each screw and plate move together vertically, but so that the screws may turn independently of their plates. This is usually accomplished by providing annular grooves 18 around the screws towards their lower ends, and inserting pins 19 horizontally through the plates 16 and 17 in such a manner that they rest partly in the said grooves.

Between the supporting flanges 9ª and 10ª and spaced from both of them a block 20 is secured to the table 1; the upper surface of this block is substantially level with the supporting flanges. On the table fulcrum brackets 21 are also secured between which a lever 22 is pivotally mounted. Intermediately of its length this lever has a pressure plate 23 thereon, which is so positioned that when the lever is pulled down it will strike the top of the block. A spring 24 is so arranged as to normally hold the lever in raised position as indicated at 22ª in Figure 4.

On the base 3 a transformer 25, having primary and secondary windings 26 and 27 is located. 28 indicates a source of energy and 29 is a switch, so that connection may be made through either lead 30 or 30ª and either a part or all of the primary winding utilized. 32 is a wire from the source of energy to the primary winding 26. From the secondary winding 27 wires 33 and 34 are run to the bolts 7 and 8 respectively.

It will be noted that in the construction shown the table 1 is made of wood which proves quite satisfactory on account of the low voltage employed. But other material may be used therefor so long as the screws 7 and 8 and the angle members 5 and 6 are insulated from one another and also from the block 20.

Band saw blade portions 11 and 11ª adjacent to their ends are clamped between the supporting flanges 9ª and 10ª and their respective clamping plates 16 and 17; the ends of the blade portions should preferably be bevelled as indicated in Figure 5. It will also be seen from Figure 4 that the rear margins of the blade portions should also bear against the back of the angle brackets 9 and 10 to insure the said portions being in line with one another. Solder and flux are applied between the adjacent bevelled surfaces at 11^b where the joint is to be made and the current is turned on. As soon as the solder has fused the current is cut off again and the pressure plate 23 is pressed down on the upper surface of the joint thereby insuring that a tight, flat joint is made.

While in the foregoing the preferred embodiment of the invention has been described and shown it is understood that the construction is susceptible to such changes as fall within the scope of the appended claims. Moreover the invention, while described as applied for brazing band saw blades may of course be adapted for kindred uses.

What I claim is:

1. A device of the character described comprising a table having brackets thereon, said brackets being insulated from one another, a supporting flange on each of said brackets, said flanges being substantially in line with one another, clamping plates vertically movable over said flanges and supported by said brackets, a fixed block between the adjacent ends of said flanges having its upper surface substantially level with said flanges and insulated from them, a lever pivotally mounted on said table, and a pressure plate on said lever adapted to bear down on said fixed block, in combination with an electric circuit having a wire connected to each of said brackets so that said circuit is adapted to be closed by pieces of conducting material extending inwards from said supporting flanges and coming in contact with one another over said block.

2. An electric brazing machine comprising a table having angle members mounted thereon substantially in line with one another, spaced apart, and insulated from one another, forwardly extending flanges on said members terminating substantially flush with the adjacent ends of said members, forwardly extending eyes on said members having threaded openings therethrough, screws in threaded engagement with said eyes, clamping plates on the lower ends of said screws adapted to move vertically over said flanges, a fixed block on said table between and horizontally substantially in line with said flanges and insulated from them, a lever pivotally mounted on said table, and a pressure plate on said lever adapted to contact with said fixed block, each flange and its clamping plate being adapted to hold a band saw blade portion adjacent to one of its ends so that said ends are in contact with one another over said fixed block, in combination with an electric circuit having a wire connected to each of said angle members so that said circuit is closed through said contacting band saw blade ends.

3. An electric brazing machine comprising a table having angle members mounted thereon substantially in line with one another, spaced apart, and insulated from one another, angle brackets having forwardly extending supporting flanges secured to said angle members, eyes having threaded openings therethrough extending forwardly from said angle brackets, screws in threaded engagement with said threaded openings, clamping plates on the lower ends of the screws adapted to move vertically over said supporting flanges, a block between the adjacent ends of said flanges and insulated from them, a lever pivotally mounted on said table, a pressure plate on said lever adapted to contact said block, and spring means adapted to hold said lever upwards so that said pressure plate is out of contact from said block, in combination with an electric circuit having a wire connected to each of said angle members so that said circuit is adapted to be closed by pieces of conducting material extending inwards from said flanges and held thereon by said clamping plates, said pieces of conducting material being in contact with one another at their ends.

ALBERT T. KOEHLER.